United States Patent
Liao et al.

(10) Patent No.: US 11,669,875 B2
(45) Date of Patent: Jun. 6, 2023

(54) PRICING METHOD AND DEVICE, AND NON-TRANSIENT COMPUTER-READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Peng Liao, Beijing (CN); Xinyi Wu, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 457 days.

(21) Appl. No.: 16/764,647

(22) PCT Filed: Nov. 15, 2018

(86) PCT No.: PCT/CN2018/115622
§ 371 (c)(1),
(2) Date: May 15, 2020

(87) PCT Pub. No.: WO2019/105235
PCT Pub. Date: Jun. 6, 2019

(65) Prior Publication Data
US 2020/0410557 A1 Dec. 31, 2020

(30) Foreign Application Priority Data
Nov. 30, 2017 (CN) .......................... 201711231736.X

(51) Int. Cl.
*G06Q 30/02* (2023.01)
*G06Q 30/0283* (2023.01)
(Continued)

(52) U.S. Cl.
CPC ......... *G06Q 30/0283* (2013.01); *G06F 17/16* (2013.01); *G06Q 30/0206* (2013.01)

(58) Field of Classification Search
CPC ........................... G06Q 30/0283; G06F 17/16
(Continued)

(56) References Cited

U.S. PATENT DOCUMENTS

| 2012/0215601 A1 | 8/2012 | McGuire |
| 2013/0166353 A1* | 6/2013 | Mihic .................... G06Q 30/02 705/400 |

(Continued)

FOREIGN PATENT DOCUMENTS

| CN | 103530786 A | 1/2014 |
| CN | 105205701 A | 12/2015 |

(Continued)

OTHER PUBLICATIONS

Gizem Hökeleklia et al., "Private label line proliferation and private label tier pricing: A new dimension of competition between private labels and national brands", Jan. 17, 2017, Journal of Retailing and Consumer Services 36 (2017) 39-52 (Year: 2017).*

(Continued)

*Primary Examiner* — Shannon S Campbell
*Assistant Examiner* — Freda A Nelson
(74) *Attorney, Agent, or Firm* — Oblon, McClelland, Maier & Neustadt, L.L.P.

(57) ABSTRACT

The present invention relates to the technical field of electronic commerce, and provided thereby are a pricing method performed by a computer and device, and a non-transient computer-readable storage medium. The pricing method includes: determining a price vector to be tested and a reference conversion rate score according to a set of price vectors and a conversion rate score corresponding to each price vector, wherein each price vector in the set of price (Continued)

- S102 Determine a price vector under test and a reference conversion rate score according to a set of price vectors and conversion rate scores corresponding to the price vectors

- S104 Determine an adjustment direction and determine an adjusted price vector according to the adjustment direction

- S106 Update the current prices of the SKUs with the prices in the adjusted price vector vectors comprises the price of one or more inventory units in the same period; selecting an optimization direction according to a result of comparison between the conversion rate score corresponding to the price vector to be tested and the reference conversion rate score, and determining an optimized price vector on the basis of the optimization direction; and updating the current price of the inventory unit using the price in the optimized price vector.

19 Claims, 7 Drawing Sheets

(51) Int. Cl.
    *G06F 17/16*     (2006.01)
    *G06Q 30/0201*     (2023.01)

(58) Field of Classification Search
    USPC .................................................. 705/7.35, 400
    See application file for complete search history.

(56) References Cited

U.S. PATENT DOCUMENTS

| | | | |
|---|---|---|---|
| 2014/0156378 A1 | 6/2014 | McGuire | |
| 2014/0278804 A1* | 9/2014 | Lanxner | G06Q 30/0206 |
| | | | 705/7.35 |
| 2017/0109767 A1* | 4/2017 | Shpanya | G06Q 30/0283 |
| 2017/0228744 A1* | 8/2017 | Booth | G06Q 30/0639 |

FOREIGN PATENT DOCUMENTS

| | | | | |
|---|---|---|---|---|
| CN | 106096998 A | | 11/2016 | |
| CN | 107194722 A | | 9/2017 | |
| GB | 2407184 A | * | 4/2005 | ....... G06Q 10/06375 |

OTHER PUBLICATIONS

Chinese Office Action dated May 28, 2020 in Chinese Patent Application No. 201711231736.X, 4 pages.
International Search Report dated Jan. 30, 2019 in PCT/CN2018/115622 (with English translation), 12 pages.

* cited by examiner

PRICING METHOD AND DEVICE, AND NON-TRANSIENT COMPUTER-READABLE STORAGE MEDIUM

CROSS-REFERENCE TO RELATED APPLICATIONS

The present disclosure is based on and claims priority of Chinese application for invention 201711231736.X, filed on Nov. 30, 2017, the disclosure of which is hereby incorporated into this disclosure by reference in its entirety.

TECHNICAL FIELD

The present disclosure relates to the technical field of e-commerce, and in particular, to a pricing method, a device, and a non-transient computer-readable storage medium.

BACKGROUND

Dynamic pricing is usually implemented for a single Stock Keeping Unit (SKU). In related arts, for large-scale commodity pricing management, the main method is to assign different Procurement & Sales personnel to different categories of commodities for management. This method mainly divides commodities into several levels based on sales volume and clicks of these commodities, and arranges the levels in order according to the degree of importance. The number of Price Management Procurement & Sales personnel assigned to each level will decrease as the grade decreases. Each Price Management Procurement & Sales staff usually sets a lower price for a high-level SKU than business competitors to get high sales; and sets a higher price for a lower-level SKU than business competitors for high profits. Prices on webpages are usually modified and released by Procurement & Sales personnel manually.

SUMMARY

After analyzing the related arts, the inventors found that the pricing method in the related arts still has a problem of low traffic conversion rate, that is, the ratio of the sales volume, the gross merchandise volume, or the profit of a SKU to the click rate of the SKU is low.

One technical problem to be solved by the embodiments of the present disclosure is: how to improve traffic conversion rate.

According to a first aspect of some embodiments of the present disclosure, a pricing method performed by a computer, comprising: determining a price vector under test and a reference conversion rate score according to a set of price vectors and conversion rate scores corresponding to the price vectors, wherein each of the price vectors in the set comprises prices of one or more SKUs in a period; determining an adjustment direction according to a comparison result between a conversion rate score corresponding to the price vector under test and the reference conversion rate score; determining an adjusted price vector based on the adjustment direction; and updating current prices of the SKUs with the prices in the adjusted price vector.

In some embodiments, the determining a price vector under test comprising: determining an average price vector according to the price vectors in the set, wherein a price corresponding to a SKU in the average price vector is an average or median of all prices corresponding to the same SKU in the set; and determining the price vector under test by adjusting the average price vector to a direction opposite to a price vector with a lowest conversion rate score in the set.

In some embodiments, the adjusted price vector is determined by adjusting the average price vector or the price vector under test to the adjustment direction.

In some embodiments, the reference conversion rate score comprises the highest conversion rate score among the conversion rate scores corresponding to the price vectors in the set; and the direction of the price vector under test is determined as the adjustment direction in case that the conversion rate score corresponding to the price vector under test is higher than the highest conversion rate score.

In some embodiments, the determining an adjusted price vector based on the adjustment direction comprises: generating a deep adjustment vector by adjusting the price vector under test to the adjustment direction; determining the deep adjustment vector as the adjusted price vector in case that a conversion rate score corresponding to the deep adjustment vector is higher than the highest conversion rate score; and determining the price vector under test as the adjusted price vector in case that the conversion rate score corresponding to the deep adjustment vector is not higher than the highest conversion rate score.

In some embodiments, the reference conversion rate score comprises the lowest conversion rate score among the conversion rate scores corresponding to the price vectors in the set; and a direction of the price vector corresponding to the lowest conversion rate score is determined as the adjustment direction in case that the conversion rate score corresponding to the price vector under test is lower than the lowest conversion rate score.

In some embodiments, the determining an adjusted price vector based on the adjustment direction comprises: generating an inward contraction vector by adjusting an average price vector to the adjustment direction; determining the adjusted price vector by adjusting the inward contraction vector to the direction of a price vector corresponding to the highest conversion rate score among the conversion rate scores corresponding to the price vectors in the set in case that a conversion rate score corresponding to the inward contraction vector is lower than the lowest conversion rate score; and determining the inward contraction vector as the adjusted price vector in case that the conversion rate score corresponding to the inward contraction vector is not lower than the lowest conversion rate score.

In some embodiments, the reference conversion rate score comprises the lowest conversion rate score and the second lowest conversion rate score among the conversion rate scores corresponding to the price vectors in the set respectively; and an opposite direction of a price vector corresponding to the lowest conversion rate score is determined as the adjustment direction in case that the conversion rate score corresponding to the price vector under test is between the lowest conversion rate score and the second lowest conversion rate score.

In some embodiments, the determining an adjusted price vector based on the adjustment direction comprises: generating an outward contraction vector by adjusting an average price vector to the adjustment direction; determining the adjusted price vector by adjusting the outward contraction vector to a direction of a price vector corresponding to the highest conversion rate score among the conversion rate scores corresponding to the price vectors in the set in case that a conversion rate score corresponding to the outward contraction vector is lower than the conversion rate score corresponding to the price vector under test; and determining the outward contraction vector as the adjusted price vector in case that the conversion rate score corresponding to the outward contraction vector is not lower than the conversion rate score corresponding to the price vector under test.

In some embodiments, the reference conversion rate score comprises the highest conversion rate score and the second lowest conversion rate score among the conversion rate scores corresponding to the price vectors in the set; and the price vector under test is determined as the adjusted price vector in case that the conversion rate score corresponding to the price vector under test is between the highest conversion rate score and the second lowest conversion rate score.

In some embodiments, the pricing method further comprises: replacing the price vector corresponding to the lowest conversion rate score among the conversion rate scores corresponding to the price vectors in the set with the adjusted price vector.

In some embodiments, a conversion rate score is directly proportional to at least one of a gross merchandise volume, a sales volume, and a profit of a corresponding price vector, and is inversely proportional to a pageview volume.

In some embodiments, the conversion rate score f is calculated using the formula of:

$$f = \frac{\beta * GMV + (1-\beta)[\gamma * SV + (1-\gamma) * PF]}{PV}$$

wherein, $\beta$ and $\gamma$ are preset coefficients, GMV is the gross merchandise volume, SV is the sales volume, PF is the profit, and PV is the pageview volume.

In some embodiments, the pricing method further comprises: obtaining training data comprising prices and corresponding actual conversion rates of multiple SKUs; establishing a regression model with actual conversion rate as a dependent variable and price as an independent variable, and training the regression model using the training data; predicting predicted conversion rates of test data comprising prices of the multiple SKUs and corresponding actual conversion rates according to the trained regression model; generating the set of price vectors according to prices of SKUs whose difference between the predicted conversion rate and the actual conversion rate is less than a preset degree.

According to a second aspect of some embodiments of the present disclosure, a pricing device is provided, including: a memory; a processor coupled to the memory, the processor configured to execute the pricing method for performing instructions comprising: determining a price vector under test and a reference conversion rate score according to a set of price vectors and conversion rate scores corresponding to the price vectors, wherein each of the price vectors in the set comprises prices of one or more SKUs in a period; determining an adjustment direction according to a comparison result between a conversion rate score corresponding to the price vector under test and the reference conversion rate score; determining an adjusted price vector based on the adjustment direction; and updating current prices of the SKUs with the prices in the adjusted price vector.

In some embodiments, the determining a price vector under test comprising: determining an average price vector according to the price vectors in the set, wherein a price corresponding to a SKU in the average price vector is an average or median of all prices corresponding to the same SKU in the set; and determining the price vector under test by adjusting the average price vector to a direction opposite to a price vector with a lowest conversion rate score in the set.

In some embodiments, the adjusted price vector is determined by adjusting the average price vector or the price vector under test to the adjustment direction.

In some embodiments, the instructions further comprise: replacing the price vector corresponding to the lowest conversion rate score among the conversion rate scores corresponding to the price vectors in the set with the adjusted price vector.

In some embodiments, the instructions further comprise: obtaining training data comprising prices and corresponding actual conversion rates of multiple SKUs; establishing a regression model with actual conversion rate as a dependent variable and price as an independent variable, and training the regression model using the training data; predicting predicted conversion rates of test data comprising prices of the multiple SKUs and corresponding actual conversion rates according to the trained regression model; generating the set of price vectors according to prices of SKUs whose difference between the predicted conversion rate and the actual conversion rate is less than a preset degree.

According to a third aspect of some embodiments of the present disclosure, a non-transient computer-readable storage medium is provided on which a computer program is stored, characterized in that the program implements the pricing method for performing instructions comprising: determining a price vector under test and a reference conversion rate score according to a set of price vectors and conversion rate scores corresponding to the price vectors, wherein each of the price vectors in the set comprises prices of one or more SKUs in a period; determining an adjustment direction according to a comparison result between a conversion rate score corresponding to the price vector under test and the reference conversion rate score; determining an adjusted price vector based on the adjustment direction; and updating current prices of the SKUs with the prices in the adjusted price vector.

Some embodiments of the present disclosure have the following advantages or beneficial effects. In the embodiments of the present disclosure, a price vector including prices of multiple SKUs may be used as an optimization unit, and an adjustment direction may be determined according to a result of comparison between a conversion rate score corresponding to a price vector under test and a reference conversion rate score, so that the multiple SKUs can be adjusted as a whole, which can improve the traffic conversion rate. In addition, prices can be updated automatically without manual involvement, so that labor costs can be reduced.

Other features and advantages of the present invention will become apparent from the following detailed description of exemplary embodiments of the present disclosure with reference to the accompanying drawings.

BRIEF DESCRIPTION OF THE DRAWINGS

In order to more clearly explain the embodiments of the present invention or the technical solutions in the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION

Figure 1:
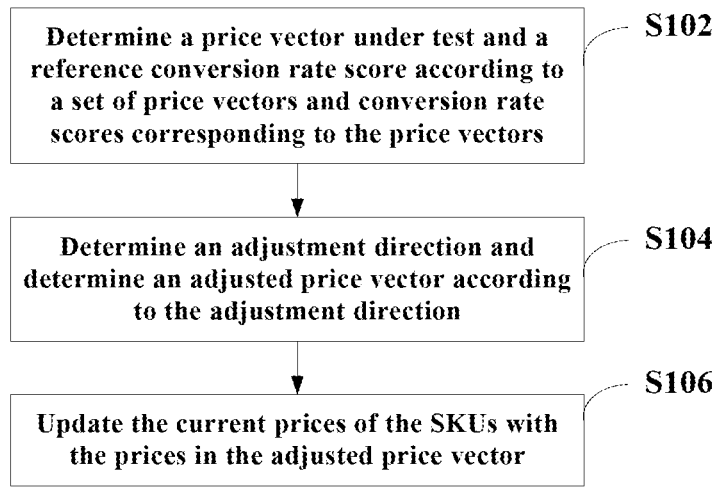
FIG. 1 is a schematic flowchart of a pricing method according to some embodiments of the present disclosure.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by persons of ordinary skill in the art based on the embodiments of the present disclosure without creative efforts shall fall within the protection scope of the present disclosure.

Unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an article is defined in a drawing, there is no need for further discussion in the accompanying drawings.

After analyzing the related arts, the inventors found that dynamic pricing in the related arts is adjustment to a single SKU without considering the impact on other related commodities after the adjustment of the single SKU. For example, for some related commodities, an increase in the price of a certain SKU will cause a decrease in the sales of a related SKU. This is because consumers have limited overall budgets. For another example, for some competing commodities, after reducing the price of a certain SKU, although the sales volume of that SKU is increased, the sales volume of its competitive SKU may be decreased.

The inventors verified the above analysis based on existing data. First, relations of sales volume and conversion rate to SKU price are established as shown in formulas (1) and (2).

$$SV = a_1 \cdot T + b_1 \cdot T' \quad (1)$$

$$C = a_2 \cdot T + b_2 \cdot T' \quad (2)$$

In formulas (1) and (2), T is a transaction price of a current commodity, T' is a comprehensive transaction price of other related commodities, SV is a sales volume of the current commodity, C is the conversion rate of the current commodity, and $a_1$, $b_1$, $a_2$ and $b_2$ are coefficients.

For two commodities that have a competitive relationship, taking toothpaste with different effects of the same brand as an example, a linear fitting is made to the above formulas using existing data. The fitting results are $a_1 = -70.541$, $b_1 = 9.874$, $a_2 = -0.023$, and $b_2 = 0.003$. Since $a_1$, $a_2$ are greater than 0, and $b_1$, $b_2$ are less than 0, for this product, that is, the selected toothpaste, the lower the transaction price of this product, the higher the sales and conversion rate of this product, and the higher the overall transaction price of other toothpastes, the higher the sales and conversion rate of this product.

For two commodities with a complementary relationship, taking a lotion and a toner of a same brand and series as an example, a linear fitting is performed on the sales and conversion rate of the lotion. According to the result of linear fitting, $a_1 = -0.717$, $b_1 = -0.322$, $a_2 = -0.001$, and $b_2 = -0.001$. The lower the transaction price of the lotion, the higher the sales and conversion rate of the lotion; and if the transaction price of the lotion is lower, it will also promote the sales and conversion rate of the lotion.

Therefore, if pricing is only considered from the perspective of a single SKU, the overall traffic conversion rate performance may be poor due to the impact on the sales and conversion rate of related commodities.

Therefore, the inventors provide a method for conjoint pricing of multiple SKUs to overcome the problem of low traffic conversion rate caused by the pricing method in the related arts. FIG. 1 is a schematic flowchart of a pricing method according to some embodiments of the present disclosure. As shown in FIG. 1, the pricing method of this embodiment includes steps S102 to S106.

In step S102, a price vector under test and a reference conversion rate score is determined according to a set of price vectors and conversion rate scores corresponding to the price vectors, wherein each of the price vectors in the set comprises prices of one or more SKUs in a period.

In some embodiments, the SKUs involved in the price vectors in the set of price vectors may belong to the same category. Therefore, different SKUs in the set of price vectors have a greater correlation, so that the pricing result can further improve the traffic conversion rate.

The same dimension in different vectors represents the prices of the same SKU at different periods. For example, the set of price vectors includes the prices of SKUs A~E, and the prices of different SKUs in different periods of a month are shown in Table 1.

TABLE 1

|  | Days 1 to 4 | Days 5 to 9 | Days 10 to 14 | Days 15 to 19 | Days 20 to 25 |
| --- | --- | --- | --- | --- | --- |
| SKU A | 60 | 62 | 59 | 61 | 60 |
| SKU B | 115 | 113 | 111 | 112 | 114 |
| SKU C | 6 | 7 | 6.5 | 7.2 | 7.1 |
| SKU D | 1999 | 1989 | 1999 | 1999 | 1998 |
| SKU E | 245 | 249 | 249 | 248 | 259 |

The set of price vectors P can be represented as P={[60, 115,6,1999,245], [62,113,7,1989,249], [59,111,6.5,1999, 249], [61,112,7.2,1999,248], [60,114,7.1,1998,259]}.

The conversion rate score of a SKU is determined based on a traffic conversion rate when a certain online price of the SKU is adopted. The traffic conversion rate can be, for example, a ratio of any one of the SKU's sales volume, gross merchandise volume, or profit to its clicks. In some embodiments, the value of the conversion rate can be directly used as the conversion rate score, or the conversion rate can be calculated with a preset coefficient to obtain the conversion rate score, or a preset method can be used to perform calculation of different types of conversion rates to get a conversion rate score. Among the conversion rate scores of the set of price vectors, the highest conversion rate score can be used as an optimal conversion rate score, the lowest conversion rate score can be used as a worst conversion rate score, the second lowest conversion rate score can be used as the penultimate conversion rate score, and so on.

In some embodiments, three different types of conversion rates may be set, which are respectively the ratio of the sales volume, gross merchandise volume, or profit of SKU to the click rate of the SKU. The conversion rate score is directly proportional to at least one of the gross merchandise volume, the sales volume, and the profit of a corresponding price vector, and is inversely proportional to the pageview volume. An exemplary calculation method of the conversion rate score f can be referred to formula (3).

$$f = \frac{\beta * GMV + (1-\beta)[\gamma * SV + (1-\gamma) * PF]}{PV} \quad (3)$$

In formula (3), $\beta$ and $\gamma$ are preset coefficients, GMV is the gross merchandise volume, SV is the sales volume, PF is the profit, and PV is the pageview volume. In the pricing process of related arts, in general, sales or clicks are considered separately, and analysis of factors such as gross merchandise volume and profit is ignored. However, some embodiments of the present disclosure can comprehensively evaluate the impact of price on multiple dimensions such as sales volume, gross merchandise volume, and profit.

The price vector under test refers to a price vector that is used as the basis for adjustment when trying to adjust the price. The price vector under test is not in the same direction as the worst price vector corresponding to the lowest conversion rate score. It either tends to the direction of the optimal price vector corresponding to the highest conversion rate score or deviates from the direction of the worst price vector. For example, the price vector under test may be a price vector that reflects the overall level of the current set of price vectors, or a vector generated by adjusting a price vector that reflects the overall level of the current set of price vectors to a preset direction.

In some embodiments, an average price vector may be determined according to the price vectors in the set of price vectors, and then the average price vector is adjusted in the opposite direction of a price vector with the lowest conversion rate score in the set of price vectors to obtain the price vector under test. That is, the average price vector is adjusted away from the less effective price vector to test whether a higher conversion rate score will be obtained. When determining the average price vector, an average price of each SKU or a median price of each SKU can be calculated to generate the average price vector.

After determining the price vector under test, the prices in the price vector under test can be tested online, and data during the online test can be collected to obtain a conversion rate.

In step S104, an adjustment direction is determined according to a comparison result between a conversion rate score corresponding to the price vector under test and the reference conversion rate score, and an adjusted price vector is determined based on the adjustment direction.

The adjustment direction is the direction of a price vector corresponding to the reference conversion rate, or its opposite direction. Whether the direction or the opposite direction of the price vector is specifically used needs to be determined based on the comparison result, so that the adjusted price vector will tend to the direction of the price vector whose conversion rate score is higher than a preset value, or deviate from the price vector whose conversion rate score is lower than a preset value, so as to increase the probability of a higher conversion rate score for the adjusted price vector.

The reference conversion rate score is a conversion rate score with a preset ranking after ranking the conversion rate scores corresponding to the price vectors in the set of price vectors. For example, the highest conversion rate score can be used as an optimal conversion rate score, the lowest conversion rate score can be used as a worst conversion rate score, the second lowest conversion rate score can be used as a penultimate conversion rate score, and so on. The highest conversion rate score, the lowest conversion rate score and the second lowest conversion rate score are all exemplary reference conversion rate scores. Those skilled in the art can select a reference conversion rate score as needed.

The adjustment direction may be determined according to the comparison result and the direction of a price vector corresponding to the reference conversion rate score. In some embodiments, the adjustment direction may be the direction of the price vector corresponding to the reference conversion rate score if the conversion rate score of the price vector under test is higher than the reference conversion rate score and the ranking of the reference conversion rate score is higher than a preset value; and the adjustment direction may be the opposite direction of the price vector corresponding to the reference conversion rate score if the conversion rate score of the price vector under test is lower than the reference conversion rate score, and the ranking of the reference conversion rate score is lower than a preset value.

In some embodiments, during the adjustment, the adjusted price vector is determined by adjusting the average price vector or the price vector under test to the adjustment direction. That is, the average price vector can be adjusted to the adjustment direction, or the price vector under test can also be adjusted to the adjustment direction.

In step S106, the current prices of the SKUs are updated with the prices in the adjusted price vector.

After the adjusted price vector is determined, the price corresponding to each SKU in the adjusted price vector can be officially launched to the webpage or the APP as the price of each SKU after this adjustment.

With the method of the above embodiment, a price vector including prices of multiple SKUs can be used as an adjustment unit, and an adjustment direction can be determined according to a result of comparison between a conversion rate score corresponding to the price vector under test and a reference conversion rate score, so that multiple SKUs can be adjusted as a whole, which can improve the traffic conversion rate. In addition, prices can be updated automatically without manual involvement, so that labor costs can be reduced.

In some embodiments, SKUs may be screened in advance, and SKUs with a strong correlation between price and traffic conversion rate may be adjusted in the manner of the embodiment of the present disclosure. An embodiment of a method for generating a set of price vectors of the present disclosure will be described below with reference to FIG. 2.

Figure 2:
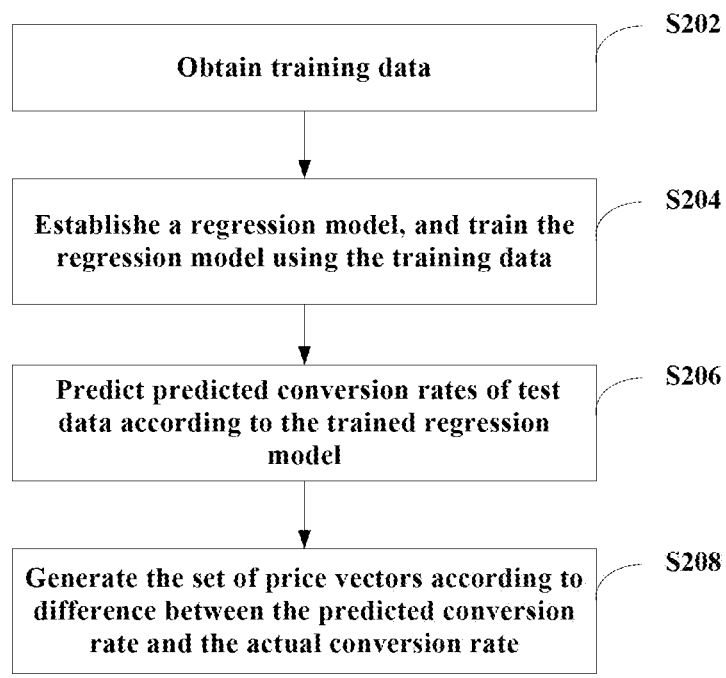
FIG. 2 is a schematic flowchart of a method for generating a set of price vectors according to some embodiments of the present disclosure.

FIG. 2 is a schematic flowchart of a method for generating a set of price vectors according to some embodiments of the present disclosure. As shown in FIG. 2, the method for generating a set of price vectors in this embodiment includes steps S202 to S208.

In step S202, training data comprising prices and corresponding actual conversion rates of multiple SKUs is obtained.

In some embodiments, abnormal values in the training data may be removed when the training data is obtained. For example, the following method can be used: firstly, calculating the median of the prices of the SKUs in the training data; next, subtracting the median from transaction prices to obtain several differences; then, calculating the median of the differences, and removing training data corresponding to differences greater than 5 times of the difference median. Therefore, abnormal data can be excluded, and the accuracy of price prediction can be improved.

In step S204, a regression model is established with actual conversion rate as a dependent variable and price as an independent variable, and the regression model is trained using the training data. Those skilled in the art may select a regression model according to needs, for example, a ridge regression model or a lasso regression model may be selected.

In step S206, predicted conversion rates of test data comprising prices of the multiple SKUs and corresponding actual conversion rates is predicted according to the trained regression model.

In step S208, the set of price vectors is generated according to prices of SKUs whose difference between the predicted conversion rate and the actual conversion rate is less than a preset degree. If the result of the linear fitting is close to the actual result, it indicates that the prices of the SKUs and the conversion rates have a certain correlation, so the pricing based on the conversion rate score optimization method according to the embodiment of the present disclosure will further increase the conversion rate.

Let the conversion rate of a SKU be C; let the transaction price be T, that is, the price actually paid by users when purchasing the SKU; and let the list price be R, that is, the price of the SKU marked on a webpage or APP by a merchant, and $\theta_1$ to $\theta_9$ are parameters. In some embodiments, the model may be represented by formula (4).

$$C = \theta_0 + \theta_1 T + \theta_2 T^2 + \theta_3 T^3 + \theta_4 R + \theta_5 R^2 + \theta_6 R^3 + \theta_7 T \cdot R + \theta_8 \frac{1}{T} + \theta_9 \frac{1}{R} \quad (4)$$

To simplify the representation, let the conversion rate of SKU be y, and use $\vec{x}$ and $\vec{\theta}$ to represent a feature vector and a regression coefficient vector respectively, as shown in formulas (5) to (7).

$$y = \vec{\theta}^T \vec{x} \quad (5)$$

$$\vec{x} = \left[T, T^2, T^3, R, R^2, R^3, T \cdot R, \frac{1}{T}, \frac{1}{R}\right]^T \quad (6)$$

$$\vec{\theta} = [\theta_0, \theta_1, \theta_2, \theta_3, \theta_4, \theta_5, \theta_6, \theta_7, \theta_8, \theta_9]^T \quad (7)$$

In the ridge regression model, the solution $\vec{\theta}_{ridge}$ of ridge regression can be expressed by formula (8).

$$\vec{\theta}_{ridge} = \underset{\vec{\theta}}{\operatorname{argmin}} \sum_{i=1}^{n} \left(y_i - \vec{\theta}^T \vec{x}\right)^2 + \lambda \|\vec{\theta}\|_2^2 \quad (8)$$

In the lasso regression model, the solution $\vec{\theta}_{lasso}$ of lasso regression can be expressed by formula (9).

$$\vec{\theta}_{lasso} = \underset{\vec{\theta}}{\operatorname{argmin}} \sum_{i=1}^{n} \left(y_i - \vec{\theta}^T \vec{x}\right)^2 + \lambda \|\vec{\theta}\|_1 \quad (9)$$

In formula (8) and (9), $y_i$ represents the predicted conversion rate of the i-th SKU.

5-fold cross-validation is performed by taking the values of the penalty coefficient λ as 1e-3, 1e-2, 1e-1, 1e1, 1e2, and 1e3, respectively. That is, data is divided into five equal parts, one of which is selected as the test group, and the other four as the training group to calculate a mean square error. Among different results corresponding to different models and different penalty coefficients, the one with the smallest mean square error is selected as the model. In some embodiments, a ridge regression with λ=1e-1 is selected as the model. After the determined model is trained by training data, fitting coefficients are obtained as $\vec{\theta}$=[0.169, −1.072e−0.3, 1.027e−0.5, 3.979e−0.8, −2.453e−0.3, 3.754e−0.5, −1.053e−0.7, −1.916e−0.5, 2.023e−0.6, 2.063e−0.6]. As required, those skilled in the art may also use only one price type, or other types of prices, or other regression models for calculation, which will not be repeated here.

After the model is determined, a linear fitting can be performed with the test conversion rate as an independent variable and the actual conversion rate as a dependent variable. If the slope of the fitting result is within a preset range of about 1 and the intercept is within a preset range of about 0, it indicates that the prediction result is close to the actual result, so that the price of SKU and the conversion rate have a strong correlation.

In some embodiments, the method of this embodiment of the present disclosure may be performed iteratively to continuously and dynamically adjust prices. An embodiment of pricing of the present disclosure will be described below with reference to FIG. 3.

Figure 3:
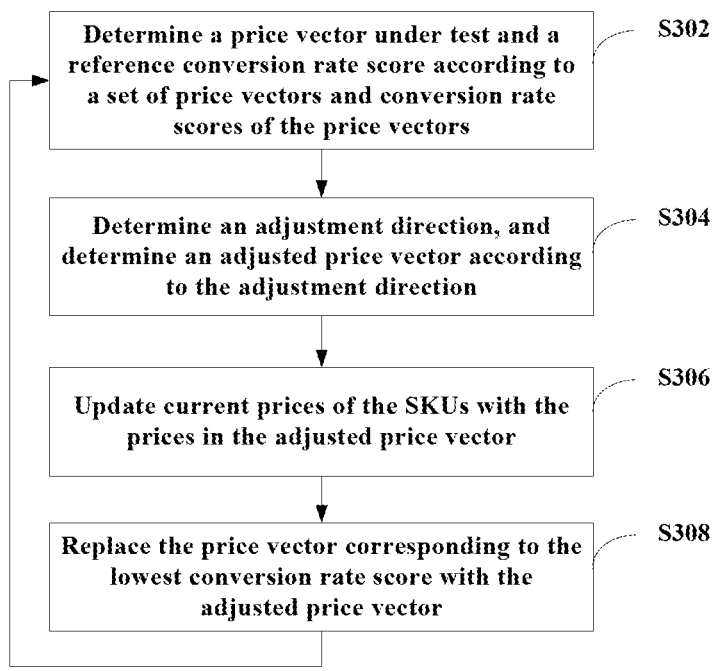
FIG. 3 is a schematic flowchart of a pricing method according to other embodiments of the present disclosure.

FIG. 3 is a schematic flowchart of a pricing method according to other embodiments of the present disclosure. As shown in FIG. 3, the pricing method of this embodiment includes steps S302 to S308.

In step S302, a price vector under test and a reference conversion rate score are determined according to a set of price vectors and conversion rate scores of the price vectors, wherein each of the price vectors in the set comprises prices of one or more SKUs in a period.

In step S304, an adjustment direction is determined according to a comparison result between a conversion rate score of the price vector under test and the reference conversion rate score, and an adjusted price vector is determined based on the adjustment direction.

In step S306, current prices of the SKUs are updated with the prices in the adjusted price vector.

For specific implementations of steps S302 to S306, reference may be made to steps S102 to S106, and the details will not be described herein again.

In step S308, the price vector corresponding to the lowest conversion rate score among the conversion rate scores corresponding to the price vectors in the set is replaced with the adjusted price vector, and the process returns to step S302.

Therefore, the price vectors in the set of price vectors can be continuously adjusted, the overall traffic conversion rate of the set of price vectors can be improved, and the traffic conversion rate brought by the prices determined by the embodiment of the present disclosure can be further improved.

Several exemplary adjusted price vector determination methods in the embodiment of the present disclosure will be introduced below.

The direction of the price vector under test is determined as the adjustment direction in case that the conversion rate score of the price vector under test is better than the highest conversion rate score. The highest conversion rate score is a conversion rate score with the highest value in the set of price vectors, and the price vector corresponding to the highest conversion rate score can be regarded as the optimal price vector. Therefore, optimization can be continually performed in the current direction of the price vector under test if its effect is better.

Let the average price vector be $x_a$, the price vector under test be $x_r$, the worst price vector be $x_w$, and a deep adjustment vector obtained after optimization be $x_e$. Then, in some embodiments, the calculation method shown in formulas (10) to (11) may be adopted, where $\alpha$ and $\gamma$ are both preset parameters greater than 0.

$$x_r = x_a + \alpha(x_a - x_w) \quad (10)$$

$$x_e = x_r + \gamma(x_r - x_a) \quad (11)$$

That is, the average price vector can first be adjusted away from the worst price vector to obtain the price vector under test. If the effect of the price vector under test is good, the price vector under test is adjusted further away from the worst price vector to obtain a better conversion rate.

In some embodiments, multiple optimizations may be performed. The optimization process in some embodiments may be shown in FIG. 4.

In step S402, a price vector under test is obtained.

In step S404, the conversion rate score of the price vector under test is compared with a highest conversion rate score.

In step S406, if the conversion rate score corresponding to the price vector under test is not better than the highest conversion rate score, it may be further compared with the lowest conversion rate score and processed accordingly, or a person skilled in the art can also select a processing method according to needs, which will not be repeated here.

In step S408, if the conversion rate score of the price vector under test is higher than the highest conversion rate score, generating a deep adjustment vector by adjusting the price vector under test to the adjustment direction.

At this point, the deep adjustment vector can be tested online, and data related to the conversion rate can be collected.

In step S410, the conversion rate score of the deep adjustment vector is compared with the highest conversion rate score.

In step S412, determining the deep adjustment vector as the adjusted price vector in case that a conversion rate score of the deep adjustment vector is higher than the highest conversion rate score.

In step S414, determining the price vector under test as the adjusted price vector in case that the conversion rate score of the deep adjustment vector is not higher than the highest conversion rate score.

Therefore, the adjusted price vector can have a traffic conversion rate as high as possible.

If the conversion rate score corresponding to the price vector under test is lower than the lowest conversion rate score, the direction of the worst price vector, i.e., the price vector corresponding to the lowest conversion rate score, can be used as the adjustment direction. That is, if the effect of the price vector under test is not good or even worse than the worst price vector, trying to do the opposite, the average price vector can be adjusted in the direction of the lowest price vector.

Let the price vector obtained after the optimization be an inward contraction vector represented by $x_c$, $x_c$ can be calculated by formula (12), where $\beta$ is a parameter greater than 0. For other variables, see the definitions of formulas (10) to (11).

$$x_c = x_a - \beta(x_a - x_w) \quad (12)$$

That is, if the effect of the price vector under test is poor, the adjustment based on the price vector under test may be abandoned, and an adjustment may be made in the direction of the worst price vector based on the average price vector.

Figure 5:
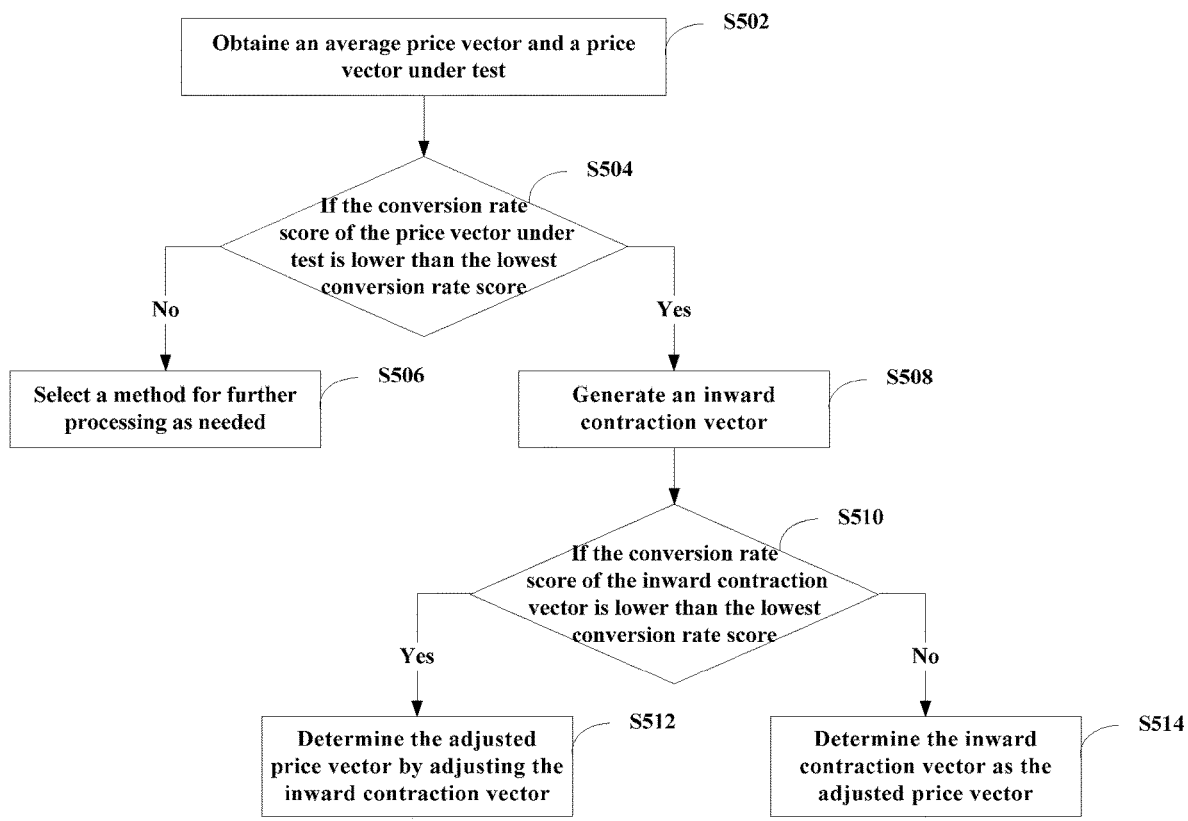
FIG. 5 is a schematic flowchart of a price vector optimization method according to other embodiments of the present disclosure.

The optimization process in some embodiments may be as shown in FIG. 5.

In step S502, an average price vector is obtained, and a price vector under test is determined based on the average price vector.

In step S504, the conversion rate score of the price vector under test is compared with the lowest conversion rate score.

In step S506, if the conversion rate score corresponding to the price vector under test is not lower than the lowest conversion rate score, those skilled in the art may select a method for further processing as needed.

For example, the price vector under test may be further compared with a second lowest conversion rate score and processed accordingly.

In step S508, if the conversion rate score corresponding to the price vector under test is lower than the lowest conversion rate score, generating an inward contraction vector by adjusting an average price vector to the adjustment direction.

In step S510, the conversion rate score of the inward contraction vector is compared with the lowest conversion rate score.

In step S512, determining the adjusted price vector by adjusting the inward contraction vector to the direction of an optimal price vector, i.e., the price vector corresponding to the highest conversion rate score among the conversion rate scores corresponding to the price vectors in the set, in case that a conversion rate score of the inward contraction vector is lower than the lowest conversion rate score.

This shows that neither the deviation from the worst price vector nor the approach to the worst price vector can achieve a satisfied effect, so that it can be adjusted in the direction of the optimal price vector to improve the traffic conversion rate.

Let the adjusted price vector generated in step S512 be $x_{ci}$ and the optimal price vector be $x_b$, in some embodiments $x_{ci}$ may be calculated by using formula (13), where $\rho$ is a preset parameter greater than 0. For other variables and parameters, see the definitions of formulas (10)~(12).

$$x_{ci}=x_b+\rho(x_c-x_b) \quad (13)$$

In step S514, the inward contraction vector is determined as the adjusted price vector in case that the conversion rate score of the inward contraction vector is not lower than the lowest conversion rate score.

This shows that the adjustment direction used when generating the inward contraction vector can be retained because it has a better effect than the adjustment direction used to generate the price vector under test before.

If the conversion rate score corresponding to the price vector under test is between the lowest conversion rate score and the second lowest conversion rate score, an opposite direction of the worst price vector is taken as the adjustment direction. That is, the effect is relatively poor, but is not the lowest. A try can be done to continue to adjust using the direction that deviates from the worst price vector as the adjustment direction.

Let the price vector obtained after the optimization be an outward contraction vector represented by $x_o$, $x_o$ can be calculated using formula (14). For other variables and parameters, see the definitions of formulas (10) to (13).

$$x_o=x_a+\beta(x_a-x_w) \quad (14)$$

That is, the adjustment is still made using the direction in which the price vector under test is generated, but the amplitude of the adjustment will be changed.

Figure 6:
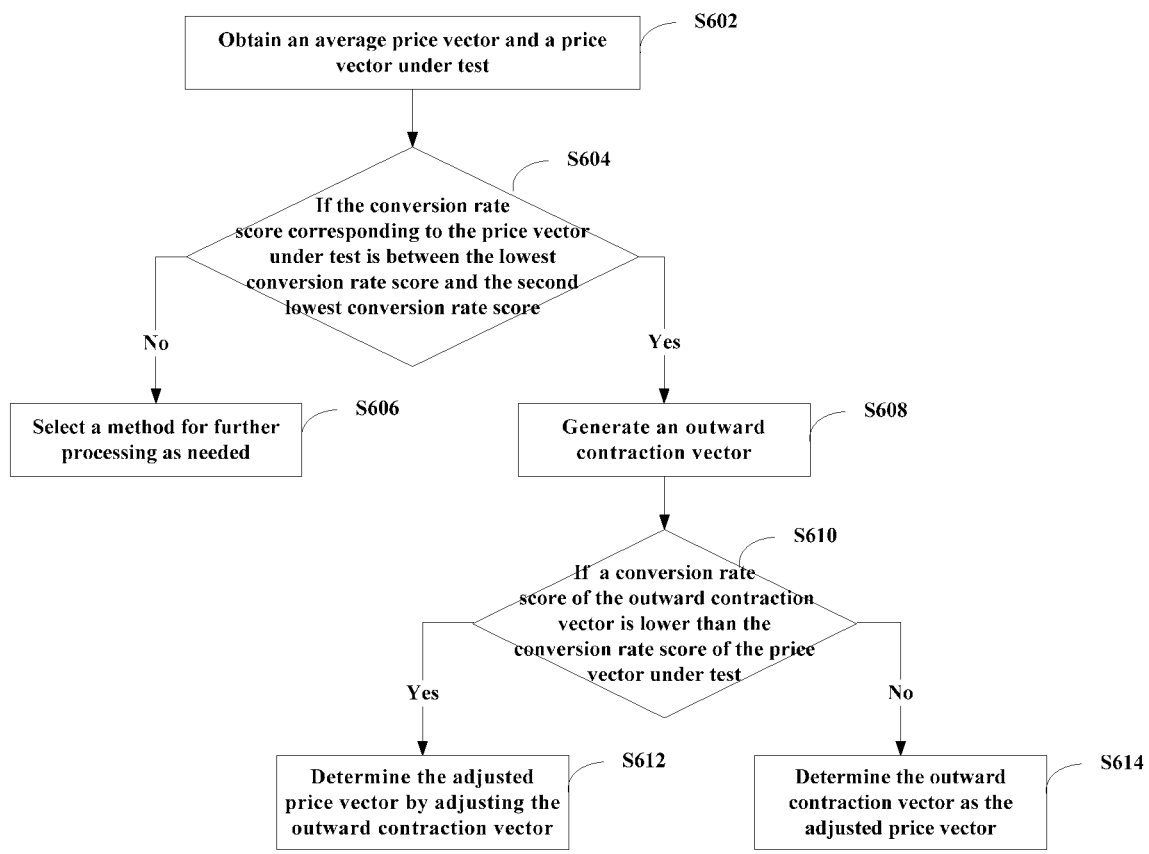
FIG. 6 is a schematic flowchart of a price vector optimization method according to still other embodiments of the present disclosure.

The adjustment process in some embodiments may be shown in FIG. 6.

In step S602, an average price vector is obtained, and a price vector under test is determined based on the average price vector.

In step S604, the conversion rate score of the price vector under test is compared with the lowest conversion rate score and the second lowest conversion rate score.

In step S606, if the conversion rate score corresponding to the price vector under test is not between the lowest conversion rate score and the second lowest conversion rate score, those skilled in the art may select a method for further processing as needed.

For example, the conversion rate score of the price vector under test can be further compared with the highest conversion rate score or the lowest conversion rate score.

In step S608, an opposite direction of the worst price vector, i.e., the price vector corresponding to the lowest conversion rate score, is determined as the adjustment direction in case that the conversion rate score of the price vector under test is between the lowest conversion rate score and the second lowest conversion rate score, and an outward contraction vector is generated by adjusting an average price vector to the adjustment direction.

In some embodiments, the adjustment amplitude used when generating the outward contraction vector may be smaller than the adjustment amplitude used when generating the price vector under test.

In step S610, the conversion rate score of the outward contraction vector is compared with the conversion rate score corresponding to the price vector under test.

In step S612, determining the adjusted price vector by adjusting the outward contraction vector to a direction of a price vector corresponding to the highest conversion rate score among the conversion rate scores corresponding to the price vectors in the set in case that a conversion rate score of the outward contraction vector is lower than the conversion rate score of the price vector under test.

This shows that neither the outward contraction vector nor the price vector under test is desirable, so the original adjustment direction can be discarded, and an adjustment can be made toward the optimal price vector.

Let the adjusted price vector generated in step S612 be $x_{oi}$, in some embodiments $x_{oi}$ may be calculated by using formula (15). For other variables and parameters, see the definitions of formulas (10) to (14).

$$x_{oi}=x_b+\rho(x_o-x_b) \quad (15)$$

In step S614, determining the outward contraction vector as the adjusted price vector in case that the conversion rate score of the outward contraction vector is not lower than the conversion rate score of the price vector under test.

This shows that the outward contraction vector can achieve a slightly better effect, so it can be used as the adjusted price vector.

In some embodiments, the price vector under test is determined as the adjusted price vector in case that the conversion rate score of the price vector under test is between the highest conversion rate score and the second lowest conversion rate score. That is, the adjustment direction is the direction of the price vector under test, and the optimization amplitude is 0.

Figure 4:
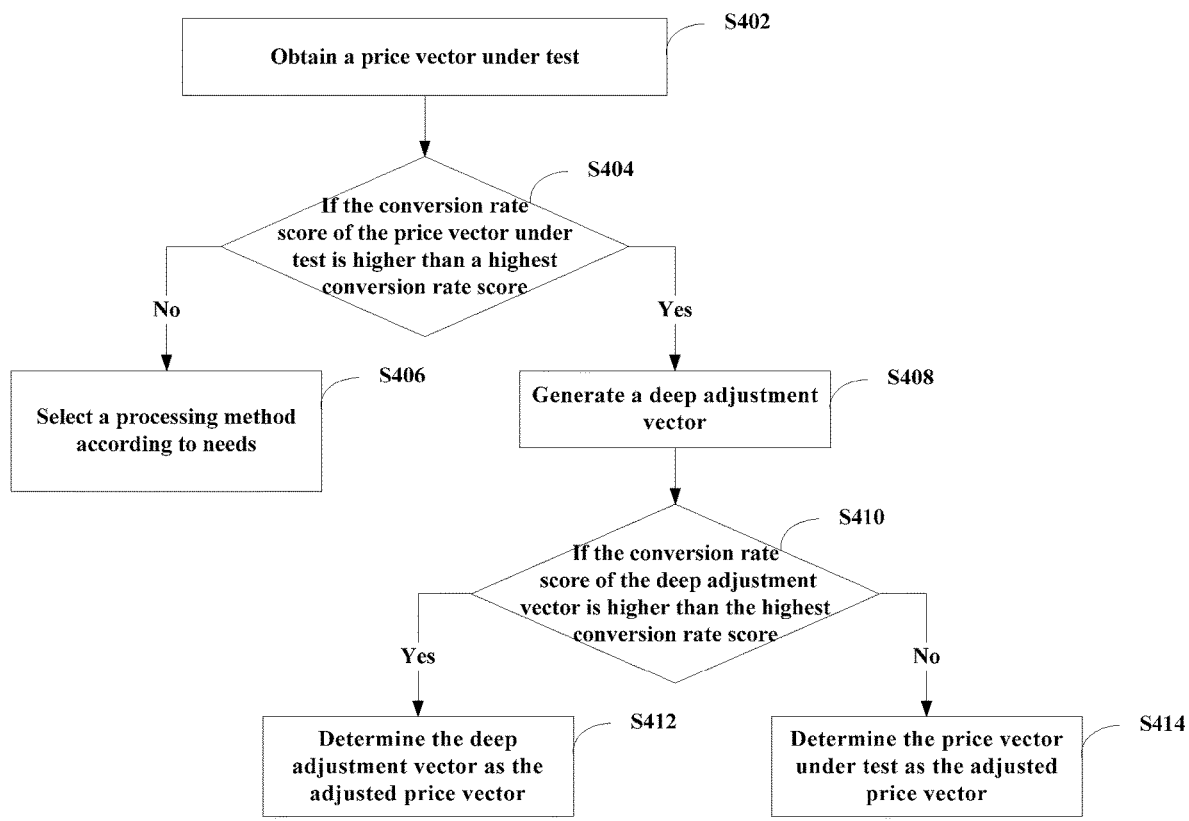
FIG. 4 is a schematic flowchart of a price vector optimization method according to some embodiments of the present disclosure.

The methods shown in the embodiments of FIG. 4 to FIG. 6 may be executed independently or in combination. In some embodiments, the method of the embodiment of FIG. 4 may be performed first. The method of the embodiment of FIG. 5 is performed in step S406 of the embodiment of FIG. 4, and the method of the embodiment of FIG. 6 is performed in step S506 of the embodiment of FIG. 6. Those skilled in the art can also adjust the order of these embodiments, add, delete, or modify these embodiments according to needs, which will not be repeated here.

Through the method of the above embodiment, the price vector can be adjusted multiple times to obtain pricing that can improve the traffic conversion rate. The present disclosure does not move the price vector under test or the average price vector to the optimal price vector, because the optimal price vector is likely to be a local optimal solution. The purpose of this disclosure is to explore more effective pricing in different directions, so that the pricing of SKUs can adapt to the changing external environment in a timely manner, and keep the traffic conversion rate at a high level for a long time.

An embodiment of a pricing device of the present disclosure will be described below with reference to FIG. 7.

Figure 7:
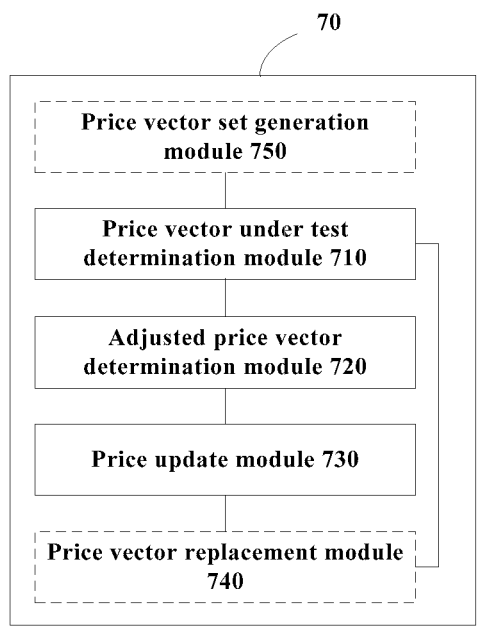
FIG. 7 is a schematic structural diagram of a pricing device according to some embodiments of the present disclosure.

FIG. 7 is a schematic structural diagram of a pricing device according to some embodiments of the present disclosure. As shown in FIG. 7, the pricing device 70 of this embodiment includes a price vector under test determination module 710 for determining a price vector under test and a reference conversion rate score according to a set of price vectors and conversion rate scores corresponding to the price vectors, wherein each of the price vectors in the set comprises prices of one or more SKUs in a period; an adjusted price vector determination module 720 for determining an adjustment direction according to a comparison result between a conversion rate score corresponding to the price vector under test and the reference conversion rate score, and determining an adjusted price vector based on the adjustment direction; a price update module 730 for updating current prices of the SKUs with the prices in the adjusted price vector.

In some embodiments, the price vector under test determination module 710 may be further used for determining an average price vector according to the price vectors in the set; and determining the price vector under test by adjusting the average price vector to a direction opposite to a price vector with a lowest conversion rate score in the set.

In some embodiments, the adjusted price vector determination module 720 may be further used for determining the adjusted price vector by adjusting the average price vector or the price vector under test to the adjustment direction.

In some embodiments, the reference conversion rate score comprises the highest conversion rate score among the conversion rate scores corresponding to the price vectors in the set; the adjusted price vector determination module 720 may be further used for determining the direction of the price vector under test as the adjustment direction in case that the conversion rate score corresponding to the price vector under test is higher than the highest conversion rate score.

In some embodiments, the adjusted price vector determination module 720 may be further used for: generating a deep adjustment vector by adjusting the price vector under test to the adjustment direction; determining the deep adjustment vector as the adjusted price vector in case that a conversion rate score corresponding to the deep adjustment vector is higher than the highest conversion rate score; and determining the price vector under test as the adjusted price vector in case that the conversion rate score corresponding to the deep adjustment vector is not higher than the highest conversion rate score.

In some embodiments, the reference conversion rate score comprises the lowest conversion rate score among the conversion rate scores corresponding to the price vectors in the set; the adjusted price vector determination module 720 may be further used for determining a direction of the price vector corresponding to the lowest conversion rate score as the adjustment direction in case that the conversion rate score corresponding to the price vector under test is lower than the lowest conversion rate score.

In some embodiments, the adjusted price vector determination module 720 may be further used for: generating an inward contraction vector by adjusting an average price vector to the adjustment direction; determining the adjusted price vector by adjusting the inward contraction vector to the direction of a price vector corresponding to the highest conversion rate score among the conversion rate scores corresponding to the price vectors in the set in case that a conversion rate score corresponding to the inward contraction vector is lower than the lowest conversion rate score; and determining the inward contraction vector as the adjusted price vector in case that the conversion rate score corresponding to the inward contraction vector is not lower than the lowest conversion rate score.

In some embodiments, the reference conversion rate score comprises the lowest conversion rate score and the second lowest conversion rate score among the conversion rate scores corresponding to the price vectors in the set respectively; the adjusted price vector determination module 720 may be further used for determining an opposite direction of a price vector corresponding to the lowest conversion rate score as the adjustment direction in case that the conversion rate score corresponding to the price vector under test is between the lowest conversion rate score and the second lowest conversion rate score.

In some embodiments, the adjusted price vector determination module 720 may be further used for: generating an outward contraction vector by adjusting an average price vector to the adjustment direction; determining the adjusted price vector by adjusting the outward contraction vector to a direction of a price vector corresponding to the highest conversion rate score among the conversion rate scores corresponding to the price vectors in the set in case that a conversion rate score corresponding to the outward contraction vector is lower than the conversion rate score corresponding to the price vector under test; and determining the outward contraction vector as the adjusted price vector in case that the conversion rate score corresponding to the outward contraction vector is not lower than the conversion rate score corresponding to the price vector under test.

In some embodiments, the reference conversion rate score comprises the highest conversion rate score and the second lowest conversion rate score among the conversion rate scores corresponding to the price vectors in the set; the adjusted price vector determination module 720 may be further used for determining the price vector under test as the adjusted price vector in case that the conversion rate score corresponding to the price vector under test is between the highest conversion rate score and the second lowest conversion rate score.

In some embodiments, the pricing device 70 may further include: a price vector replacement module 740 for replacing the price vector corresponding to the lowest conversion rate score among the conversion rate scores corresponding to the price vectors in the set with the adjusted price vector.

In some embodiments, a conversion rate score is directly proportional to at least one of a gross merchandise volume, a sales volume, and a profit of a corresponding price vector, and is inversely proportional to a pageview volume.

In some embodiments, the conversion rate score f is calculated using the following formula:

$$f = \frac{\beta * GMV + (1 - \beta)[\gamma * SV + (1 - \gamma) * PF]}{PV}$$

wherein, $\beta$ and $\gamma$ are preset coefficients, GMV is the gross merchandise volume, SV is the sales volume, PF is the profit, and PV is the pageview volume.

In some embodiments, the pricing device 70 may further include a price vector set generation module 750 for obtaining training data comprising prices and corresponding actual conversion rates of multiple SKUs; establishing a regression model with actual conversion rate as a dependent variable and price as an independent variable, and training the regression model using the training data; predicting predicted conversion rates of test data comprising prices of the multiple SKUs and corresponding actual conversion rates according to the trained regression model; generating the set of price vectors according to prices of SKUs whose difference between the predicted conversion rate and the actual conversion rate is less than a preset degree.

Figure 8:
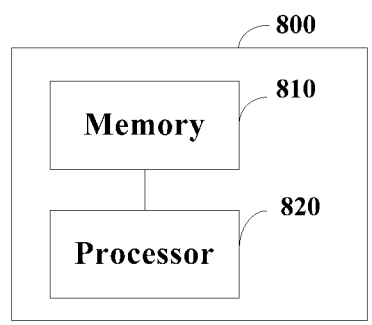
FIG. 8 is a schematic structural diagram of a pricing device according to other embodiments of the present disclosure.

FIG. 8 is a structural diagram of a pricing device according to other embodiments of the present disclosure. As shown in FIG. 8, the pricing device 800 of this embodiment includes a memory 810 and a processor 820 coupled to the memory 810, the processor 820 configured to, based on instructions stored in the memory 810, carry out the pricing method according to any one of the foregoing embodiments.

Wherein, the memory 810 may include, for example, system memory, a fixed non-volatile storage medium, or the like. The system memory stores, for example, an operating system, application programs, a boot loader (Boot Loader), and other programs.

Figure 9:
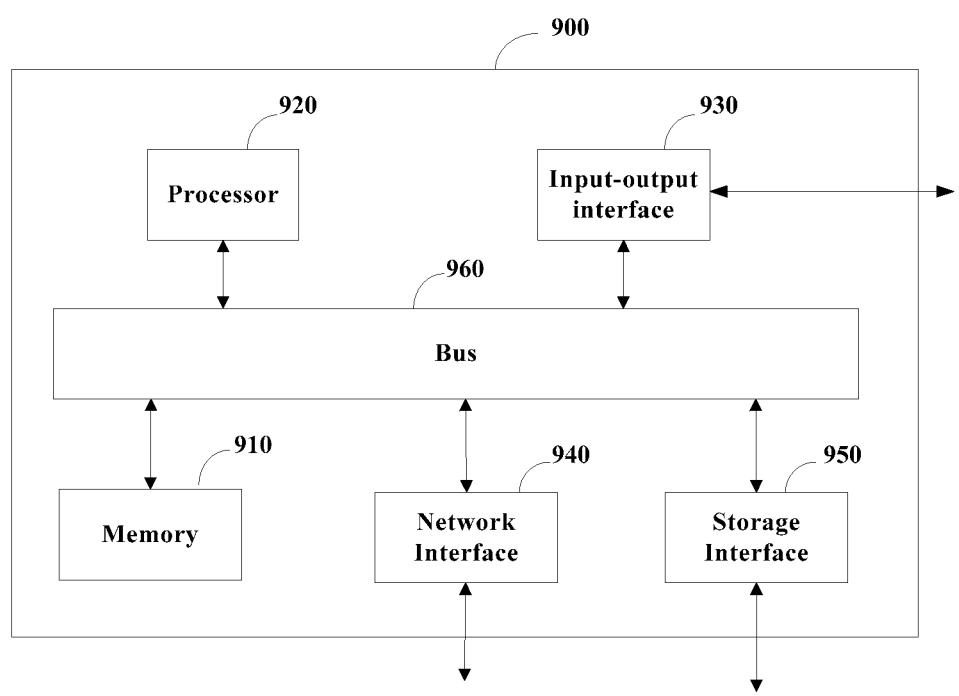
FIG. 9 is a schematic structural diagram of a pricing device according to still other embodiments of the present disclosure.

FIG. 9 is a structural diagram of a pricing device according to still other embodiments of the present disclosure. As shown in FIG. 9, the pricing device 900 of this embodiment includes a memory 910 and a processor 920, and may further include an input-output interface 930, a network interface 940, a storage interface 950, etc. These interfaces 930, 940, 950, the memory 910 and the processor 920 may be connected through a bus 960, for example. Wherein, the input-output interface 930 provides a connection interface for input/output devices such as a display, a mouse, a keyboard, and a touch screen. The network interface 940 provides a connection interface for various networked devices. The storage interface 950 provides a connection interface for external storage devices such as an SD card and a USB flash disk.

An embodiment of the present invention also provides a computer-readable storage medium on which a computer program is stored, characterized in that the program when executed by a processor implements any one of the foregoing pricing methods.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A pricing method performed by a computer, comprising:
    determining a price vector under test and a reference conversion rate score according to a set of price vectors and conversion rate scores corresponding to the price vectors, wherein each of the price vectors in the set comprises prices of one or more SKUs in a period;
    determining an adjustment direction according to a comparison result between a conversion rate score corresponding to the price vector under test and the reference conversion rate score;
    determining an adjusted price vector based on the adjustment direction;
    updating current prices of the SKUs with the prices in the adjusted price vector;
    obtaining training data comprising prices and corresponding actual conversion rates of multiple SKUs;
    establishing a regression model with actual conversion rate as a dependent variable and price as an independent variable, and training the regression model using the training data;
    predicting predicted conversion rates of test data comprising prices of the multiple SKUs and corresponding actual conversion rates according to the trained regression model; and
    generating the set of price vectors according to prices of SKUs whose difference between the predicted conversion rate and the actual conversion rate is less than a preset degree.

2. The pricing method according to claim 1, wherein the determining a price vector under test comprising:
    determining an average price vector according to the price vectors in the set, wherein a price corresponding to a SKU in the average price vector is an average or median of all prices corresponding to a same SKU in the set; and
    determining the price vector under test by adjusting the average price vector to a direction opposite to a price vector with a lowest conversion rate score in the set.

3. The pricing method according to claim 2, wherein the adjusted price vector is determined by adjusting the average price vector or the price vector under test to the adjustment direction.

4. The pricing method according to claim 1, wherein the reference conversion rate score comprises a highest conversion rate score among the conversion rate scores corresponding to the price vectors in the set; and the direction of the price vector under test is determined as the adjustment direction in case that the conversion rate score corresponding to the price vector under test is higher than the highest conversion rate score.

5. The pricing method according to claim 4, wherein
the determining an adjusted price vector based on the adjustment direction comprises:
generating a deep adjustment vector by adjusting the price vector under test to the adjustment direction;
determining the deep adjustment vector as the adjusted price vector in case that a conversion rate score corresponding to the deep adjustment vector is higher than the highest conversion rate score; and
determining the price vector under test as the adjusted price vector in case that the conversion rate score corresponding to the deep adjustment vector is not higher than the highest conversion rate score.

6. The pricing method according to claim 2, wherein the reference conversion rate score comprises the lowest conversion rate score among the conversion rate scores corresponding to the price vectors in the set; and
a direction of the price vector corresponding to the lowest conversion rate score is determined as the adjustment direction in case that the conversion rate score corresponding to the price vector under test is lower than the lowest conversion rate score.

7. The pricing method according to claim 6, wherein
the determining an adjusted price vector based on the adjustment direction comprises:
generating an inward contraction vector by adjusting an average price vector to the adjustment direction;
determining the adjusted price vector by adjusting the inward contraction vector to the direction of a price vector corresponding to a highest conversion rate score among the conversion rate scores corresponding to the price vectors in the set in case that a conversion rate score corresponding to the inward contraction vector is lower than the lowest conversion rate score; and
determining the inward contraction vector as the adjusted price vector in case that the conversion rate score corresponding to the inward contraction vector is not lower than the lowest conversion rate score.

8. The pricing method according to claim 2, wherein the reference conversion rate score comprises the lowest conversion rate score and a second lowest conversion rate score among the conversion rate scores corresponding to the price vectors in the set respectively; and
an opposite direction of a worst price vector corresponding to the lowest conversion rate score is determined as the adjustment direction in case that the conversion rate score corresponding to the price vector under test is between the lowest conversion rate score and the second lowest conversion rate score.

9. The pricing method according to claim 8, wherein
the determining an adjusted price vector based on the adjustment direction comprises:
generating an outward contraction vector by adjusting an average price vector to the adjustment direction;
determining the adjusted price vector by adjusting the outward contraction vector to a direction of an optimal price vector corresponding to a highest conversion rate score among the conversion rate scores corresponding to the price vectors in the set in case that a conversion rate score corresponding to the outward contraction vector is lower than the conversion rate score corresponding to the price vector under test; and determining the outward contraction vector as the adjusted price vector in case that the conversion rate score corresponding to the outward contraction vector is not lower than the conversion rate score corresponding to the price vector under test.

10. The pricing method according to claim 1, wherein the reference conversion rate score comprises a highest conversion rate score and a second lowest conversion rate score among the conversion rate scores corresponding to the price vectors in the set; and
the price vector under test is determined as the adjusted price vector in case that the conversion rate score corresponding to the price vector under test is between the highest conversion rate score and the second lowest conversion rate score.

11. The pricing method according to claim 1, further comprising:
replacing the price vector corresponding to a lowest conversion rate score among the conversion rate scores corresponding to the price vectors in the set with the adjusted price vector.

12. The pricing method according to claim 1, wherein a conversion rate score is directly proportional to at least one of a gross merchandise volume, a sales volume, and a profit of a corresponding price vector, and is inversely proportional to a pageview volume.

13. The pricing method according to claim 12, wherein the conversion rate score f is calculated using the formula of:

$$f = \frac{\beta * GMV + (1-\beta)[\gamma * SV + (1-\gamma) * PF]}{PV}$$

wherein, $\beta$ and $\gamma$ are preset coefficients, GMV is the gross merchandise volume, SV is the sales volume, PF is the profit, and PV is the pageview volume.

14. A pricing device, comprising:
a memory; and
a processor coupled to the memory, the processor configured to execute a pricing method for performing instructions comprising:
determining a price vector under test and a reference conversion rate score according to a set of price vectors and conversion rate scores corresponding to the price vectors, wherein each of the price vectors in the set comprises prices of one or more SKUs in a period;
determining an adjustment direction according to a comparison result between a conversion rate score corresponding to the price vector under test and the reference conversion rate score;
determining an adjusted price vector based on the adjustment direction;
updating current prices of the SKUs with the prices in the adjusted price vector;
obtaining training data comprising prices and corresponding actual conversion rates of multiple SKUs;
establishing a regression model with actual conversion rate as a dependent variable and price as an independent variable, and training the regression model using the training data;
predicting predicted conversion rates of test data comprising prices of the multiple SKUs and corresponding actual conversion rates according to the trained regression model; and generating the set of price vectors according to prices of SKUs whose difference between the predicted conversion rate and the actual conversion rate is less than a preset degree.

15. The pricing device according to claim 14, wherein the determining a price vector under test comprising:
   determining an average price vector according to the price vectors in the set, wherein a price corresponding to a SKU in the average price vector is an average or median of all prices corresponding to a same SKU in the set; and
   determining the price vector under test by adjusting the average price vector to a direction opposite to a price vector with a lowest conversion rate score in the set.

16. The pricing device according to claim 15, wherein the adjusted price vector is determined by adjusting the average price vector or the price vector under test to the adjustment direction.

17. The pricing device according to claim 14, wherein the instructions further comprise:
   replacing the price vector corresponding to a lowest conversion rate score among the conversion rate scores corresponding to the price vectors in the set with the adjusted price vector.

18. The pricing device according to claim 14, wherein the instructions further comprise:
   obtaining training data comprising prices and corresponding actual conversion rates of multiple SKUs;
   establishing a regression model with actual conversion rate as a dependent variable and price as an independent variable, and training the regression model using the training data;
   predicting predicted conversion rates of test data comprising prices of the multiple SKUs and corresponding actual conversion rates according to the trained regression model; and
   generating the set of price vectors according to prices of SKUs whose difference between the predicted conversion rate and the actual conversion rate is less than a preset degree.

19. A non-transient computer-readable storage medium on which a computer program is stored, which when executed by a processor implements the pricing method for performing instructions comprising:
   determining a price vector under test and a reference conversion rate score according to a set of price vectors and conversion rate scores corresponding to the price vectors, wherein each of the price vectors in the set comprises prices of one or more SKUs in a period;
   determining an adjustment direction according to a comparison result between a conversion rate score corresponding to the price vector under test and the reference conversion rate score;
   determining an adjusted price vector based on the adjustment direction;
   updating current prices of the SKUs with the prices in the adjusted price vector;
   obtaining training data comprising prices and corresponding actual conversion rates of multiple SKUs;
   establishing a regression model with actual conversion rate as a dependent variable and price as an independent variable, and training the regression model using the training data;
   predicting predicted conversion rates of test data comprising prices of the multiple SKUs and corresponding actual conversion rates according to the trained regression model; and
   generating the set of price vectors according to prices of SKUs whose difference between the predicted conversion rate and the actual conversion rate is less than a preset degree.

* * * * *